United States Patent [19]

Balke

[11] Patent Number: 4,818,909

[45] Date of Patent: Apr. 4, 1989

[54] INSULATED COIL ASSEMBLY

[75] Inventor: Roy L. Balke, Erie, Pa.

[73] Assignee: General Electric Company, Salem, Va.

[21] Appl. No.: 144,137

[22] Filed: Jan. 15, 1988

[51] Int. Cl.⁴ ............................................... H02K 3/30
[52] U.S. Cl. ..................................... 310/208; 310/45; 174/121 SR; 336/206; 428/255; 428/268
[58] Field of Search ................. 310/208, 198, 43, 180, 310/184, 45, 196, 254, 201, 261; 174/121 SR, 122 G; 336/206; 428/255, 268

[56] References Cited

U.S. PATENT DOCUMENTS

| | | | |
|---|---|---|---|
| 3,735,168 | 5/1973 | Anderson | 310/208 |
| 3,811,005 | 5/1974 | Trunzo | 174/121 SR |
| 3,930,915 | 1/1976 | Mendelson | 174/121 SR |
| 4,079,191 | 3/1978 | Robertson | 174/121 SR |
| 4,204,181 | 5/1980 | Smith | 310/43 |
| 4,239,998 | 12/1980 | Hakamada | 428/268 |
| 4,246,161 | 1/1981 | Smith | 310/43 |
| 4,392,070 | 7/1983 | Zdaniewski | 310/43 |
| 4,704,322 | 11/1987 | Roberts | 428/268 |

FOREIGN PATENT DOCUMENTS 2116603  12/1978  Fed. Rep. of Germany ........ 310/43

Primary Examiner—R. Skudy
Attorney, Agent, or Firm—Arnold E. Renner

[57] ABSTRACT

An insulated coil assembly for use in electrical apparatus includes a coil of conductive wire formed in a predetermined configuration around selected portions of which is disposed an insulating layer comprised of a cured resin impregnated, close woven, heat-cleaned glass fiber tape.

19 Claims, 1 Drawing Sheet

INSULATED COIL ASSEMBLY

BACKGROUND OF THE INVENTION

The present invention relates generally to insulated coil assemblies and more specifically to an insulated coil assembly, having improved dielectric strength and heat transfer characteristics, for use in electrical apparatus such as dynamoelectric machines.

It is well known in the art to use resin impregnated tapes for insulating electrical apparatus coil assemblies. In such assemblies, an electrical conductor (hereinafter referred to as wire) is normally preformed into a desired coil configuration and the tape is then wrapped around those portions of the coil which are to be electrically insulated from adjacent coils and ground. There may also be an intermediate insulating means such as mica or, NOMEX (trademark of E. I. DuPont Company, Incorporated of Wilmington, Del.) paper which is disposed between the wire and the tape.

When woven glass tape is used in this type of structure, one of two methods is customarily employed. The first of these uses an untreated tape which is wrapped around the preformed wire configuration. This tape is then resin impregnated by a suitable process such as a vacuum-pressure process or by dipping. Because of the nature of untreated tape, this process has the disadvantage of being a very dusty process. A second method which alleviates the dust problem and which serves to increase the strength of the tape is to pretreat the tape with a suitable resin. Because the pretreated tape tends to be tacky and moist, greater problems are associated with handling of the tape, whether by machine or human. The pretreated tape also tends to give off vapors from the resins (and any solvents employed) which may be objectionable to workers performing a hand wrapping process.

In both of the the above methods, after wrapping the tape the coil assembly is usually subjected to an additional impregnating process, such as dipping or vacuum-pressure impregnation. The resulting structure, by these methods, has a tendency to be non-uniform in its coating and often includes voids. These deficiencies are primarily the result of, in the case of the untreated tape, organic materials which tend to preclude proper impregnation. In the pretreated tape case, the pretreat resin in the tape acts to block good penetration of the resin in the final impregnation step. In both cases the non-uniformity of the coating reduces the dielectric strength and the heat transfer capability of the coil assembly.

Use of "heat-cleaned" woven glass tape is known. A heat-cleaned tape is one which has been heated to a temperature sufficient to remove at least some portion of the organic materials (primarily starches) from the tape. Because a heat-cleaned tape tends to develop a tan appearance, it is sometimes referred to as "caramelized tape". One example of the use of a heat-cleaned tape is found in U.S. Pat. No. 4,392,070, "Insulated Coil Assembly and Method of Making Same" by Joseph J. Zdaniewski, which patent was issued on July 5, 1983 and is assigned to the assignee of the present invention. In this patent, an open weave (leno weave) heat-cleaned glass tape is wrapped around a wire coil and this combination is dipped into a viscous compound to provide an insulated structure. The tape strands, in this case, are used to support and reinforce the viscous compound which is normally of an epoxy nature. The result is a thick layer which has reasonable dielectric strength but is not especially heat conductive. This type of construction results in a structure which is very strong and crack resistance but, because of the thickness of the coating, is not particularly desirable for use in smaller devices or smaller confines where space is critical.

SUMMARY OF THE INVENTION

It is, therefore, an object of the present invention to provide an improved insulated coil assembly for use in electrical apparatus.

It is another object to provide an insulated coil assembly in which a preformed wire coil is selectively insulated using a resin impregnated close woven glass tape which has been heat-cleaned.

It is still a further object to provide an insulated coil assembly which is selectively insulated using a lap wound woven glass tape impregnated by a low viscosity resin.

The foregoing and other objects are achieved, in accordance with the present invention, by providing a coil of conductive wire formed in a predetermined configuration which has disposed around defined portions thereof, an insulating layer exhibiting good heat conductivity and high dielectric strength. The layer is comprised of a lap wound layer of close woven, heat-cleaned glass fiber tape impregnated with a cured resin.

BRIEF DESCRIPTION OF THE DRAWING

While the present invention is defined in particularity in the claims annexed to and forming a part of this specification, a better understanding thereof can be had from the following description taken in conjunction with the enclosed drawing in which:

DETAILED DESCRIPTION

Figure 1:
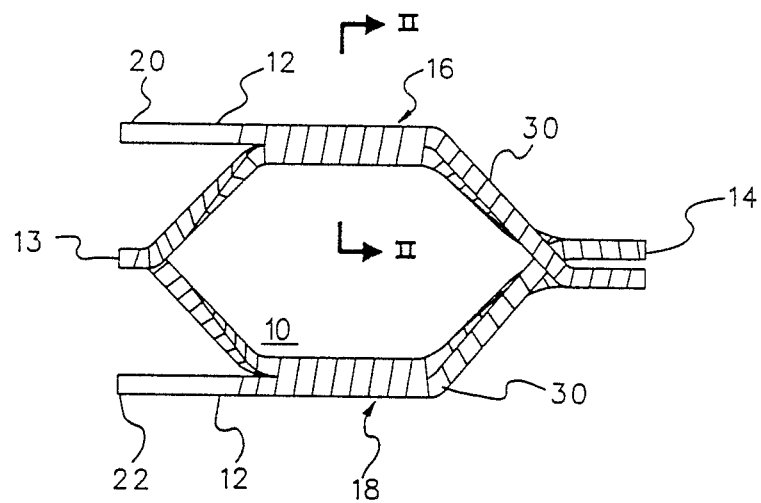
FIG. 1 is a front view of an insulated electric coil assembly in accordance with the present invention; and, FIG. 2 is an enlarged sectional view taken along line II—II of FIG. 1.
Figure 2:
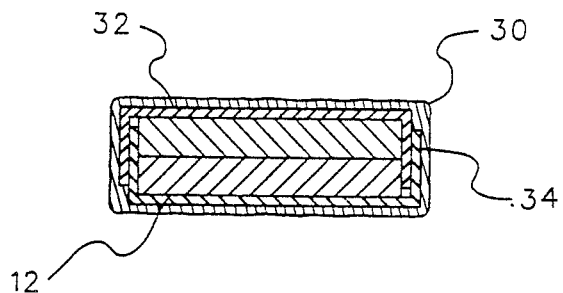

Reference is now made to the figures which illustrate a preformed motor armature coil assembly, generally at 10, comprised of an electrical conductor or wire 12. Conductor 12 is shown having a rectangular cross-sectional area (better seen with respect to FIG. 2). Coil assembly 10 includes end turns 13 and 14 and intermediate flat portions 16 and 18 which are designed to be disposed within the slots of the armature core. Two open ends 20 and 22 of the assembly 10 are left uninsulated to facilitate electrical connections within the motor. The remainder of the wire coil is covered with an insulating layer 30 in accordance with the present invention. As shown, the layer 30 is comprised of a resin impregnated lap wound tape. As further shown in FIG. 2, the cross-sectional view, there may be included two substantially U-shaped channel members 32 and 34 disposed about the wire 12 to enhance the electrical insulating properties. Typically, this additional insulation would be disposed only upon those portions of the coil which are placed within the armature slots and would be formed of a material such as NOMEX paper, as earlier described. The basic structure thus far described is one which is very common and well known to those skilled in the art.

The present invention resides in the nature of the layer 30 to provide improved electrical insulation (i.e., dielectric strength) while also exhibiting good heat conduction properties in order to cool the coil.

The tape used in accordance with the present invention is a close woven, glass fiber tape which has been heat-cleaned to remove substantially all the organic materials, (primarily starches) which may be associated with the tape and which are primarily residues from the tape manufacture process. The tape may be of any appropriate width, typically for an armature coil from ¾ to 1 inch wide, and it may be wrapped upon the wire either by hand or by machine.

In accordance with the present invention, in order to insure good impregnation by the impregnating resin, the tape would have a warp in the approximate range of from 42 to 52 and a fill in the range from approximately from 24 to 40. The yarn diameter is in the approximate range of from 3 to 6 mils. In accordance with established nomenclature, the term "warp" designates the number of strands per inch extending in the direction of the length of the tape while the term "fill" defines the number of strands per inch positioned perpendicular to the warp. The yarn may be either single strand or twisted.

The impregnating resin in accordance with the present invention may be any of those commonly used for similar structure such as polyimides, polyamides, silicones, polyesters, polyetherimides, and polyurethanes. To achieve the superior results of the present invention, however, the viscosity of the resin, in its uncured state, should be relatively low, in the approximate range from 200 to 1300 centipoises, at 25 degrees Centigrade.

Some specific examples of thermosetting solventless polyester resins which are believed particularly suitable for the present invention include that sold by General Electric Company as "GE702" which has a viscosity of the approximate range of 600 to 1000, centiposes and "GE707" which has a viscosity in the range of approximately 900 to 1200 centipoises. Another example is that which is sold by John C. Dolph Company of Monmouth Junction, N.J. under the designation of "CC-1105" which has a viscosity of the approximate range of 400 to 700 centipoises. An example of a solvent type polyester resin particularly useful for the present invention is sold by General Electric Company under the designation "GE9522". This polyester has a nominal viscosity of about 230 centipoises. All of the above centipoise examples are given at 25 degrees Centigrade.

Impregnation of the heat-cleaned tape, once it has been upon the wire coil may be by any suitable process including dipping. The preferred method, however, is the vacuum-pressure impregnation process, well known in the art. After the impregnation process, the resin is cured in a manner appropriate to the resin used; e.g., air drying, baking, etc., in accordance with practices well known in the art.

One example which is believed will provide exceptionally good results for armature coils for dc motors of the general size above 50 horsepower is an insulating layer defined by the following approximate parameters:
Warp: 50
Fill: 30
Yarn diameter: 4 Mils
Resin: GE702
Impregnation Process: Vacuum-Pressure
Curing Process: Baking While there has been described a coil assembly, particularly adapted for use in the electrical apparatus, having improved electrical insulating and heat transfer characteristics, modifications thereto will be apparent to those skilled in the art. For example, while a motor armature coil was selected for purposes of illustration, the invention is not restricted to this application and other apparatus (e.g., field coils, transformer windings, etc.) may enjoy the benefits of this invention. It is not desired therefore, that the invention be limited to the specific embodiments shown and described and it is intended to cover in the appended claims all such modifications that fall within the true spirit and scope of the invention.

What is claimed is:

1. An insulated coil assembly for use in electrical apparatus comprising:
   (a) a coil of conductive wire disposed in a predetermined configuration; and,
   (b) an insulating layer having good heat conductivity and high dielectric strength disposed over defined portions of said coil, said layer comprising a layer of close woven, heat-cleaned, glass fiber tape impregnated with a cured resin said tape having a warp in the approximate range of from 42 to 52.

2. The invention in accordance with claim 1 wherein said tape has a fill in the approximate range of from 24 to 40.

3. The invention in accordance with claim 1 wherein said tape is woven of yarn having a diameter in the approximate range of from 3 to 6 mils.

4. The invention in accordance with claim 2 wherein said tape is woven of yarn having a diameter in the approximate range of from 3 to 6 mils.

5. The invention in accordance with claim 1 wherein said resin has a viscosity, in its uncured state, in the approximate range of from 200 to 1300 centipoises at 25 degrees Centigrade.

6. The invention in accordance with claim 3 wherein said resin has a viscosity, in its uncured state, in the approximate range of from 200 to 1300 centipoises at 25 degrees Centigrade.

7. The invention in accordance with claim 4 wherein said resin has a viscosity, in its uncured state, in the approximate range of from 200 to 1300 centipoises at 25 degrees Centigrade.

8. The invention in accordance with claim 5 wherein said resin is a thermosetting polyester resin.

9. The invention in accordance with claim 8 wherein said thermosetting polyester resin is of the solventless type.

10. The invention in accordance with claim 8 wherein said thermosetting polyester resin is of the solvent type.

11. The invention in accordance with claim 4 wherein said resin is a thermosetting polyester resin.

12. The invention in accordance with claim 11 wherein said polyester resin is of the solventless type.

13. The invention in accordance with claim 1 wherein said tape has a warp of approximately 50, a fill of approximately 30, and is woven of a yarn having a diameter of approximately 4 mils.

14. The invention in accordance with claim 13 wherein said resin has a viscosity, in its uncured state, in the approximate range of from 200 to 1300 centipoises, at 25 degrees Centigrade.

15. The invention in accordance with claim 13 wherein said resin has a viscosity, in its uncured state, in the approximate range of from 600 to 1000 centipoises at 25 degrees Centigrade.

16. The invention in accordance with claim 13 wherein said resin is a thermosetting of polyester resin.

17. The invention in accordance with claim 14 wherein said resin is a thermosetting polyester resin.
18. The invention in accordance with claim 15 wherein said resin is a thermosetting polyester resin.
19. The invention in accordance with claim 16 wherein said thermosetting polyester resin is of the solventless type.

* * * * *